(12) United States Patent
Wehking et al.

(10) Patent No.: US 10,994,407 B2
(45) Date of Patent: May 4, 2021

(54) SELF-DRIVING STORAGE DEVICE

(71) Applicant: UNIVERSITAET STUTTGART, Stuttgart (DE)

(72) Inventors: Karl-Heinz Wehking, Stuttgart (DE); Matthias Hofmann, Gingen (DE); Markus Schroeppel, Fellbach (DE)

(73) Assignee: UNIVERSITAET STUTTGART, Stuttgart (DE)

( * ) Notice: Subject to any disclaimer, the term of this patent is extended or adjusted under 35 U.S.C. 154(b) by 79 days.

(21) Appl. No.: 15/767,834

(22) PCT Filed: Oct. 20, 2016

(86) PCT No.: PCT/EP2016/075268
§ 371 (c)(1),
(2) Date: Apr. 12, 2018

(87) PCT Pub. No.: WO2017/068063
PCT Pub. Date: Apr. 27, 2017

(65) Prior Publication Data
US 2018/0311811 A1 Nov. 1, 2018

(30) Foreign Application Priority Data
Oct. 20, 2015 (DE) .................... 10 2015 220 428.6

(51) Int. Cl.
*B25H 5/00* (2006.01)
*B62D 65/02* (2006.01)
*B65G 1/06* (2006.01)

(52) U.S. Cl.
CPC ............ *B25H 5/00* (2013.01); *B62D 65/022* (2013.01); *B65G 1/06* (2013.01)

(58) Field of Classification Search
CPC ... B65G 1/06; B65G 1/00; B65G 1/02; B65G 1/026; B65G 1/10; E04H 6/005;
(Continued)

(56) References Cited

U.S. PATENT DOCUMENTS 3,499,553 A    3/1970 Stienen
5,211,296 A *  5/1993 D'Heygere ............ B65G 1/026
                                                           211/1.57

(Continued)

FOREIGN PATENT DOCUMENTS

DE    16 84 789 A    9/1971
DE    39 02 080 A1   7/1990
(Continued)

*Primary Examiner* — Glenn F Myers
(74) *Attorney, Agent, or Firm* — Aslan Law, P.C.

(57) ABSTRACT

A self-driving storage device for storing and/or transporting body components of motor vehicles, base modules of motor vehicles, or motor vehicles in a final or partially assembled state, the self-driving storage device comprising a base element and a support structure which is arranged on the base element, is designed to receive the body components or the motor vehicles in a final or partially assembled state, and has a plurality of storage spaces with movable storage base elements, wherein the storage device has a movement device which is arranged on the base element and is designed such that the storage device can be moved omnidirectionally in a self-driving manner, in a floor-bound manner.

13 Claims, 4 Drawing Sheets

(58) Field of Classification Search
CPC .... E04H 6/02; E04H 6/04; E04H 6/06; E04H 6/12; E04H 6/18; E04H 6/08; E04H 6/22
See application file for complete search history.

(56) References Cited

U.S. PATENT DOCUMENTS

| | | | | |
|---|---|---|---|---|
| 6,065,921 | A * | 5/2000 | Van Dijk | E04H 6/18 |
| | | | | 414/234 |
| 8,020,714 | B2 * | 9/2011 | Miller, Jr. | A47F 3/0404 |
| | | | | 108/107 |
| 8,556,093 | B2 * | 10/2013 | Davis | A47B 57/00 |
| | | | | 211/175 |
| 9,358,975 | B1 * | 6/2016 | Watts | G05D 1/0011 |
| 9,372,027 | B2 * | 6/2016 | Yoo | F25D 25/02 |
| 9,519,882 | B2 * | 12/2016 | Galluzzo | B25J 5/007 |
| 10,065,798 | B2 * | 9/2018 | Borders | B65G 65/00 |
| 2012/0006765 | A1 | 1/2012 | Tsujimoto et al. | |
| 2013/0078062 | A1 * | 3/2013 | Artamonov | E04H 6/183 |
| | | | | 414/227 |
| 2015/0216746 | A1 * | 8/2015 | Dirauf | B62D 15/00 |
| | | | | 701/25 |
| 2016/0375814 | A1 * | 12/2016 | Jochim | B62D 57/04 |
| | | | | 414/547 |
| 2017/0018963 | A1 * | 1/2017 | Takatsu | H02J 7/025 |
| 2017/0066592 | A1 * | 3/2017 | Bastian, II | B25J 9/0096 |

FOREIGN PATENT DOCUMENTS

| | | | | |
|---|---|---|---|---|
| DE | | 4418785 A1 * | 11/1995 | B62D 7/026 |
| DE | 198 48 274 A1 | | 5/2000 | |
| DE | 20 2007 002 365 | | 7/2008 | |
| DE | 10 2012 020973 A1 | | 4/2013 | |
| DE | 10 2015 214 980 A1 | | 2/2017 | |
| EP | 0 268 965 A2 | | 6/1988 | |
| EP | 1 449 794 A1 | | 8/2004 | |
| EP | 2 062 837 A1 | | 5/2009 | |
| EP | 2 476 635 A1 | | 7/2012 | |
| FR | 2 675 785 A1 | | 10/1992 | |

* cited by examiner

SELF-DRIVING STORAGE DEVICE

The invention relates to a self-driving storage device and a material flow system comprising a storage device of this type.

In the field of the largely automated manufacture of consumer goods, in particular in the manufacture of motor vehicles, it is known to produce the consumer goods or motor vehicles that are in a final or partially assembled state on a production line or conveyor belt in a comparatively inflexible production process.

Owing to ever shorter product cycles and the continuously growing variety of products, however, the desired flexibility cannot be ensured using the existing production lines and conveyor belts.

Furthermore, it is difficult to remedy defects in assembly processes on existing production lines or conveyor belts in conveyor-belt production due to the predetermined cycle times. If the required reworking exceeds the remaining cycle time, the reworking cannot be completed without stopping the entire conveyor belt. Removing a motor vehicle from the production line or conveyor belt is also not possible using the existing material flow systems, however. By contrast, stopping the conveyor belt to carry out reworking is very expensive and needs to be avoided at all costs.

For this reason, in conveyor-belt assembly, reworking is generally carried out after final assembly of a motor vehicle is completed. A new material flow system, based on driverless transport vehicles, is intended to separate the goods to be manufactured and thus to remove the inflexible cycle times. An assembly carrier as disclosed in DE 10 2015 214980.3, for example, can be used as a mobile assembly carrier in this case. The material flow system, particularly the provision of parts, is also intended to be implemented by driverless transport vehicles. Despite the wide variety of variants, it can thus be ensured that all the components required for a vehicle to be produced can be transported into the production line by means of suitable forklift trucks, and can be mounted on the defective vehicle despite a defect that has previously arisen. Until now, a motor vehicle in which a defect has arisen during the assembly process and therefore requires reworking has been brought into a final assembled state, and the reworking required to remedy the defect is only carried out once the assembly process is complete.

If, therefore, a defect has arisen in a comparatively early assembly step, it is possible that a motor vehicle will have to be largely dismantled again in order to remedy the defect or defects. However, this kind of approach is likewise extremely expensive.

The problem addressed by the invention is therefore to provide a storage device and a material flow system in which the above-mentioned drawbacks are avoided, in particular to provide a storage device and a material flow system which allow for more flexible production and for removal of defective consumer goods in a final or partially assembled state, in particular motor vehicles in a final or partially assembled state.

This problem is solved by a self-driving storage device having the features of claim 1. The self-driving storage device in particular for storing and/or transporting body components of motor vehicles, in particular base modules of motor vehicles, or motor vehicles in a final or partially assembled state, comprises a base element and a support structure which is arranged on the base element, is designed to receive the body components or the motor vehicles in a final or partially assembled state, and has a plurality of storage spaces with movable storage base elements, wherein the storage device has a movement device which is arranged on the base element and is designed such that the storage device can be moved omnidirectionally in a self-driving manner, in particular in a floor-bound manner. Advantageously, the support structure is designed in the manner of a framework, such that sufficient stability can be ensured for receiving the body components or the motor vehicles in a final or partially assembled state.

By providing a self-driving storage device comprising a movement device by means of which the storage device can be moved omnidirectionally in a self-driving manner, it is possible to incorporate the storage device into a material flow system in which body components or motor vehicles in a final or partially assembled state can be moved on self-driving forklift trucks or driverless transport vehicles (DTV), it being possible to introduce the body components or the motor vehicles in a final or partially assembled state into the production process or remove them therefrom in a simple manner, since an inflexible production process, which is for example predetermined by a conveyor belt, can be dispensed with. Body components or motor vehicles in a final or partially assembled state can be arranged on the movable storage base elements of the self-driving storage device and can be moved to the relevant storage space.

Advantageously, the storage device is designed such that each storage space has a load-bearing capacity of at least 3 tons and such that each storage space has a horizontal extension of at least 5.5 meters to at least 2.5 meters, such that vehicles in a final assembled state, in particular cars, can be stored therein and can be moved together with the entire storage device.

A first advantageous development of the storage device provides that the support structure comprises a lifting tower comprising a lifting device for vertically moving the storage base elements and two storage towers arranged on either side of the lifting tower, the storage towers comprising the storage spaces. Using the lifting device, the storage base elements on which the body components or motor vehicles in a final or partially assembled state can be arranged can therefore be moved vertically and can be stored in a storage space in a storage tower in their respective vertical positions.

It is particularly preferable here for at least one storage base frame to be provided per storage tower, and for the support structure to comprise vertical guide rails for guiding the storage base frame. In this case, it is particularly advantageous for the storage base frame to be designed such that the storage base element can be arranged on the storage base frame such that a body component or a motor vehicle in a final or partially assembled state that is arranged on a storage base element can be securely stored. Advantageously, an interlocking storage base horizontal drive is provided which comprises an interlocking catch designed to secure the relevant storage base element in position, for example if the blocking effect of the drive fails, e.g. if the drive is not being supplied with any power.

It is also conceivable to provide a plurality of storage base frames. If just one storage base frame is provided, the storage device comprises just two storage spaces per storage tower. If two storage bases are provided, the storage device comprises three storage spaces per storage tower. If three storage bases are provided, said storage device comprises four storage spaces, etc. Advantageously, the number of storage spaces corresponds here to the number of storage base frames in the relevant storage tower plus the storage space in the base element of the storage device.

Advantageously, at least one storage base vertical drive is provided that is designed such that the at least one storage base frame is vertically movable in the storage tower. If a plurality of storage base frames are provided in the storage tower, a plurality of storage base vertical drives are advantageously provided, which can preferably be actuated separately from one another such that the different storage base frames can be moved separately from one another. It is thus possible for different vertical distances between the storage base frames to be set in a storage tower. Therefore, storage spaces having differing heights can be provided such that e.g. a greater height can be set for a vehicle in a final assembled state than for individual body components such as a base module of a motor vehicle.

It is particularly preferable here for the storage base vertical drive to be a rack-and-pinion drive. It is conceivable here for racks to be arranged in the vertical guide rails of the support structure, it being possible for an e.g. electrical drive comprising a pinion that meshes in the rack to be provided on each storage base frame, by means of which pinion the storage base frame can be moved vertically. The toothed wheel arranged on the storage base then engages in the rack arranged on the vertical support structure such that the storage base frame can be moved in a vertical direction both relative to the base element and also relative to other storage base frames, and therefore the compartment height and/or storage space height can be adjusted as desired depending on the object to be stored. In this case, it is for example conceivable to adjust the storage device to store sports cars using a low compartment height and/or storage space height, or to adjust the storage device to store sport utility vehicles using a large compartment height and/or storage space height.

In another particularly advantageous embodiment of the storage device, it is provided that a storage base horizontal drive is provided that is designed such that a storage base element can be moved horizontally into a storage space by the lifting device. Therefore, a storage base element can be moved into a vertical storage position by means of the lifting device and then can be moved horizontally into a storage space on a storage base frame of a storage tower by means of the storage base horizontal drive. Advantageously, the storage base horizontal drive is designed such that a linear guide is arranged both on the lifting platform and on the storage base frame. It is conceivable for the storage base horizontal drive to be force-locked or interlocking.

It is particularly preferable here for the storage base horizontal drive to be a rack-and-pinion drive. It is conceivable here for racks to be arranged horizontally on the lifting device and the storage base frame, a pinion that meshes with the racks and can be driven by an e.g. electrical drive can be provided on the underside of each of the storage base elements. Therefore, driving the pinion allows the storage base elements to move horizontally. The linear guide is designed as a rack for an interlocking storage base horizontal drive of this type, secure positioning being ensured by the interlocking drive. It is conceivable here for interlocking disabling to be provided by the rack in addition to the secure positioning. Therefore, if an electric motor the drives the pinion and is arranged on the storage base element is not supplied with power, redundant securing can be ensured. The storage base elements can be moved horizontally when the linear guides designed e.g. as racks are arranged so as to be horizontally aligned. The linear guides can be made to be horizontally aligned by the storage base vertical drives, it being possible to provide e.g. optical sensors that are designed to detect the vertical position of the storage base frame and thus also the linear guides. The sensors can also be designed such that they emit a stop signal when it is detected that the linear guides are vertically aligned, such that an electric motor of the storage base vertical drive that drives the pinion of the rack-and-pinion drive is stopped. If the linear guides can be vertically aligned, a storage base element can be moved horizontally by the storage base horizontal drive.

To load or unload the self-driving storage device in an automated manner, it is particularly advantageous for the lifting device to comprise a lifting platform and to be designed such that the lifting platform can be moved vertically between a loading position and at least one storage position. In the loading position, which is preferably in the vicinity of the base element, body components or motor vehicles in a final or partially assembled state can be stored in the storage device, it then being possible to carry out a vertical movement in the lifting tower to a vertical storage position in which it is then possible to move the storage base element onto a storage base frame in the horizontal direction by means of the storage base horizontal drive.

It has proved to be particularly advantageous for the lifting device to comprise a cable drive or chain drive. It is also conceivable for the lifting device to comprise an interlocking vertical drive, it likewise being possible for this vertical drive to be designed as a rack-and-pinion drive. A rack-and-pinion drive of this type can likewise comprise at least one rack and at least one pinion that meshes with the rack and is driven by an electric motor. In order to save installation space, it is however preferable for the lifting device to comprise a cable drive or chain drive. Advantageously, drive units of the cable drive or chain drive are arranged on an upper end of the lifting tower, chain strands being provided that are arranged in the supports or guide pulleys of the lifting tower. It has proved to be particularly advantageous for two geared motors that are arranged on the respective sides of the lifting tower facing the storage towers and act on a central drive shaft to be provided as a drive unit.

As a result, the lifting device can be separate from the lifting platform, such that the height of the lifting platform can be reduced. Therefore, the lifting platform can be designed to be particularly planar, and therefore the lifting platform is in the immediate vicinity of the base element. Therefore, vehicles, in particular cars, in a final or partially assembled state to which wheels are already attached can be rolled onto the lifting platform or driven onto the lifting platform in the loading position of the lifting platform without additional lifting apparatuses by means of ramp wedges that are arranged on the base element and can be extended out of said base element. It is also conceivable for extendable ramp wedges that are arranged on the base element and can be extended out of said base element to likewise be provided on the lowermost storage spaces in the storage tower of the self-driving storage device, such that the lowermost storage spaces can be loaded directly and without using the lifting device.

It is also particularly preferable for the lifting tower to comprise guide rails for guiding the lifting platform.

Another particularly advantageous embodiment of the storage device provides that the movement device is designed to be incorporated into a material flow system. Advantageously, the movement device comprises a device for location determination and position detection, and devices for data transfer comprising a master controller of a material flow system.

Another advantageous embodiment of the self-driving storage device provides that the movement device comprises at least three swivel drives, preferably at least six swivel drives. In this case, the swivel drives may be arranged on a side of the base element facing away from the support structure. It is conceivable to use swivel drives that e.g. can be used to drive four-way forklift trucks, each swivel drive having its own electrical drive. The number of swivel drives may be selected depending on the number of storage spaces and thus depending on the payload of the self-driving storage device. The swivel drives may be designed such that they are combined travel drives and steering drives. It is conceivable here for the drive axles to be designed as swiveling bolster differential drives. It is however also conceivable for the travel and steering functions to be separate, one drive being used solely as the travel drive and another drive being used solely as the steering drive, for example by a motor acting on a slewing ring.

It is particularly advantageous for the swivel drives to be able to be actuated and/or swiveled independently of one another. It is thus possible to maneuver the self-driving storage device in a minimal amount of space or to even turn the storage device on the spot. Instead of using swivel drives, it is however also conceivable to use chain drives or crawler drives, for example.

In order to load the storage device with body components or motor vehicles in a final or partially assembled state, it is particularly advantageous for the storage device to comprise at least one loading device designed to be arranged on a storage base element. It is particularly preferable here for the loading device to be designed for loading in the loading position. It is conceivable here for the loading device to be designed such that it is possible to load the lowermost storage spaces in a storage tower directly by means of the loading device without using the lifting device.

Advantageously, the loading device comprises a main body and telescopic arms that can be telescopically extended out of the main body.

It is also advantageous for the loading device to comprise a support ridge that is arranged in the center of the main body orthogonally to a longitudinal extension of the main body and in particular can be extended orthogonally to the longitudinal extension, and for the loading device to comprise support pegs that can be extended orthogonally to the longitudinal extension of the main body at the free ends of the telescopic arms. It is also possible for the loading device to be rotatably mounted such that it is possible to rotate the loading device about a vertical axis.

Therefore, it is possible to extend the loading device, it being possible to extend the telescopic arms below a body component or motor vehicle in a final or partially assembled state that is arranged on a driverless transport vehicle (DTV). The support ridge can then be brought into contact with a support point on the body component or motor vehicle in a final or partially assembled state provided for this purpose, it then being possible to retract the support pegs of the driveress transport vehicle and to extend the support pegs of the loading device. This therefore allows transfer from the driverless transport vehicle to the loading device of the storage device, such that it is possible to load the storage device without additional cranes or the like.

The problem addressed by the invention is also solved by a material flow system having the features of claim 17. A material flow system of this type comprises at least one driverless transport vehicle (DTV) in particular for transporting body components of motor vehicles, in particular base modules of motor vehicles, or motor vehicles in a final or partially assembled state, and a storage device according to at least one of claims 1 to 16.

It is particularly preferable here for the material flow system to comprise a master controller and an additional superordinate infrastructure designed to allow for an autonomous process for the driverless transport vehicle (DTV) and the self-driving storage device.

Therefore, by means of the material flow system according to the invention, highly flexible manufacture can be provided in which the defective motor vehicles in a final or partially assembled state can be easily removed from the production process or re-introduced into said process. It is also conceivable for the self-driving storage device to be used as a self-driving rack, due to the increasing variety of variants in the production process.

Further details and advantageous developments are found in the following description, with reference to which an embodiment of the invention is described and explained in greater detail.

Figure 1:
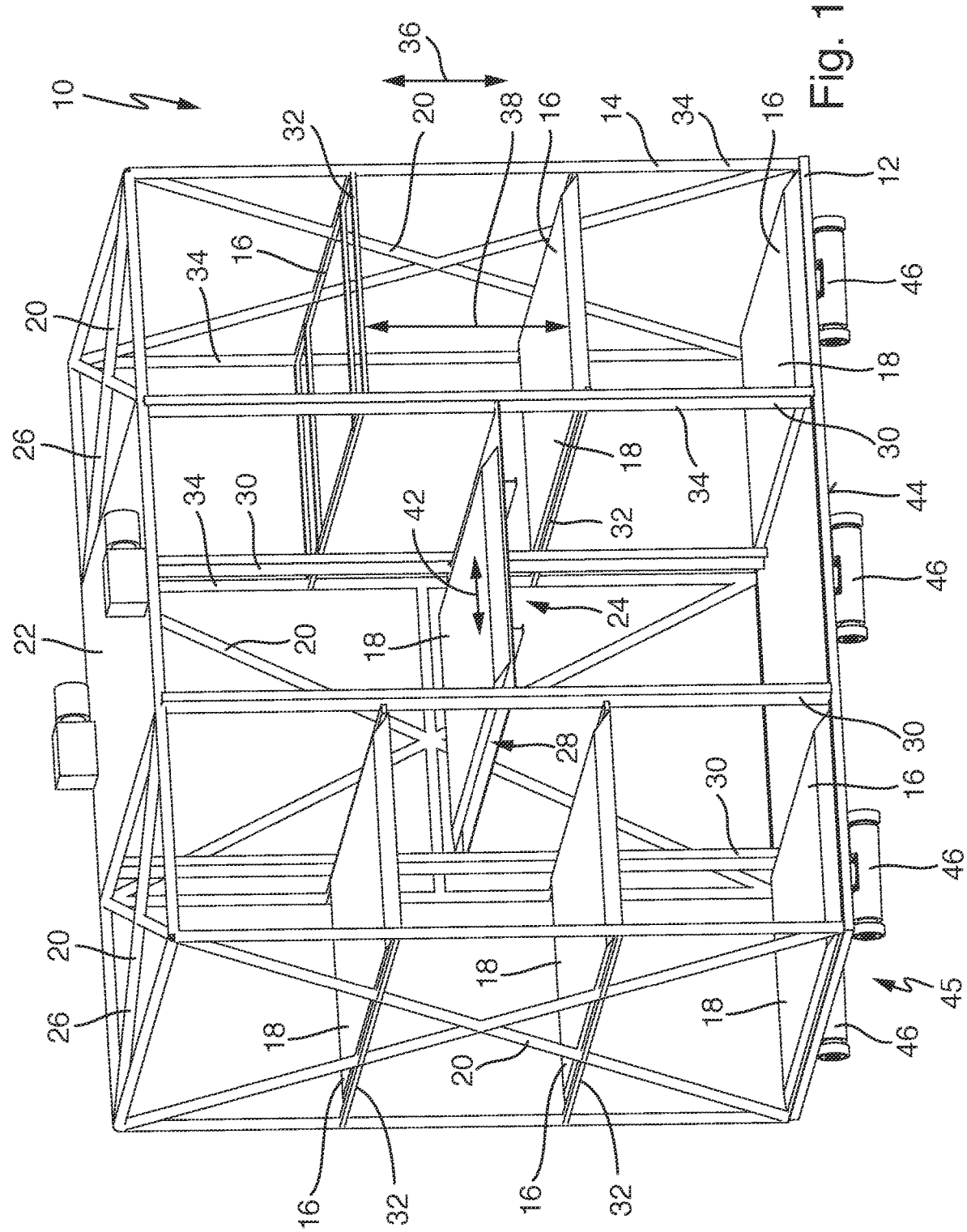
FIG. 1 shows a self-driving storage device 10 and is an oblique view of the self-driving storage device according to the invention.

The self-driving storage device 10 is designed for storing body components of motor vehicles, in particular base modules of motor vehicles, or motor vehicles in a final or partially assembled state, and comprises a planar base element 12 and a framework-like support structure 14 which is arranged on the base element, is designed to receive the body components or the motor vehicles in a final or partially assembled state, and has six storage spaces 16 with movable base elements 18 for this purpose.

The framework-like support structure 14 comprises struts 20 to increase the stability.

Furthermore, the support structure 14 comprises a lifting tower 22 comprising a lifting device 24 for vertically moving the storage base elements 18 and two storage towers 26 arranged on either side of the lifting tower 22, the storage towers comprising the storage spaces 16.

The lifting device 24 comprises a lifting platform 28. The lifting device 24 is designed such that the lifting platform 28 can be moved vertically between a loading position and at least one storage position. For this purpose, the lifting device 24 comprises a cable drive or chain drive.

The lifting platform 28, which is guided in guide rails 30 of the lifting tower 22, can be vertically moved by means of the cable drive or chain drive.

The storage device 10 comprises two storage base frames 32 per storage tower 26, the support structure 14 likewise comprising vertical guide rails 34 for guiding the storage base frame 32. The storage base elements 18 can be arranged on the storage base frame 32.

FIG. 1 shows a storage base frame 32 without a storage base element 18, this missing storage base element 18 being arranged on the lifting platform 28.

Figure 3:
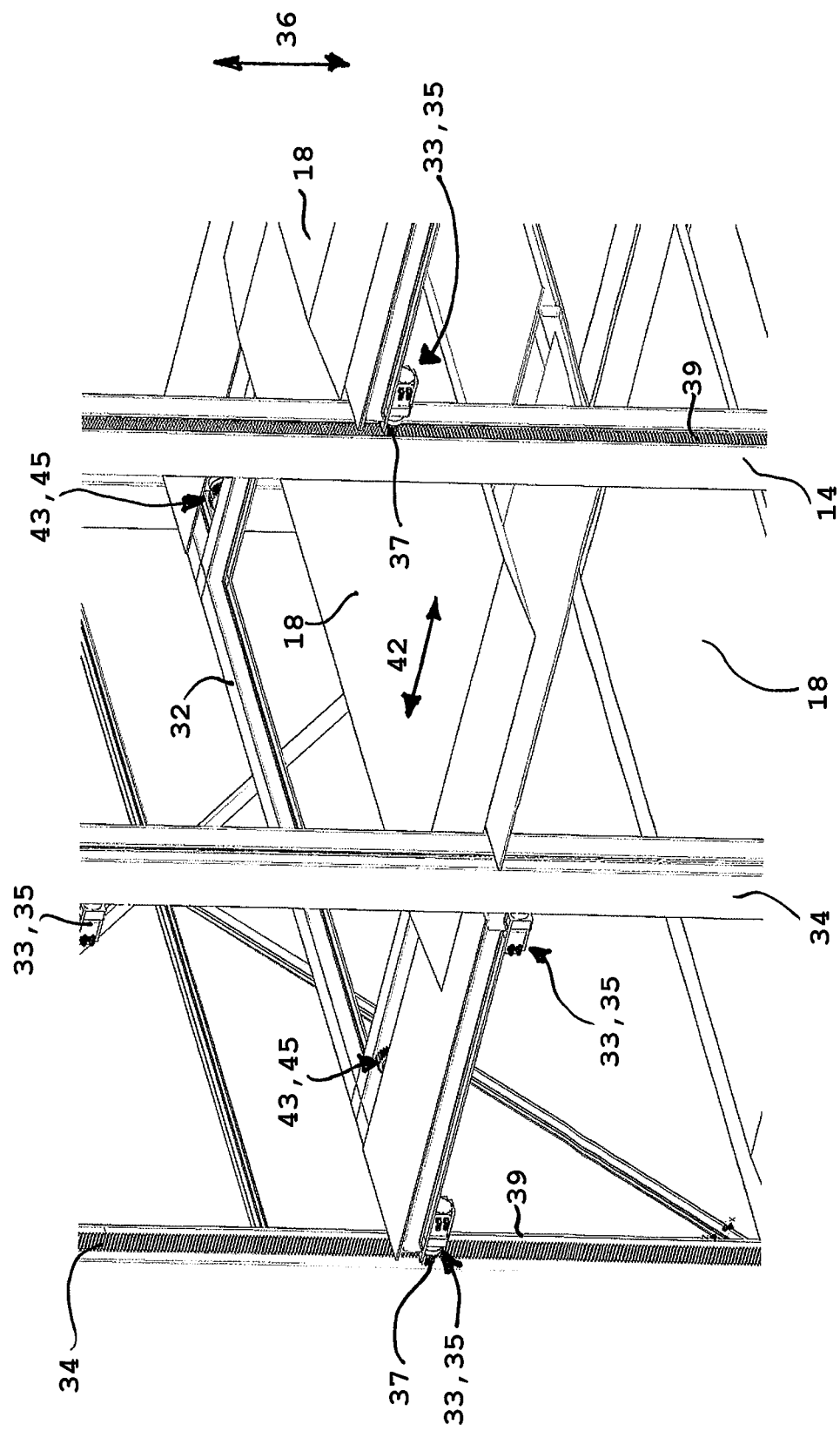
FIG. 3 shows a detail of an embodiment of the storage device according to the invention.
Figure 4:
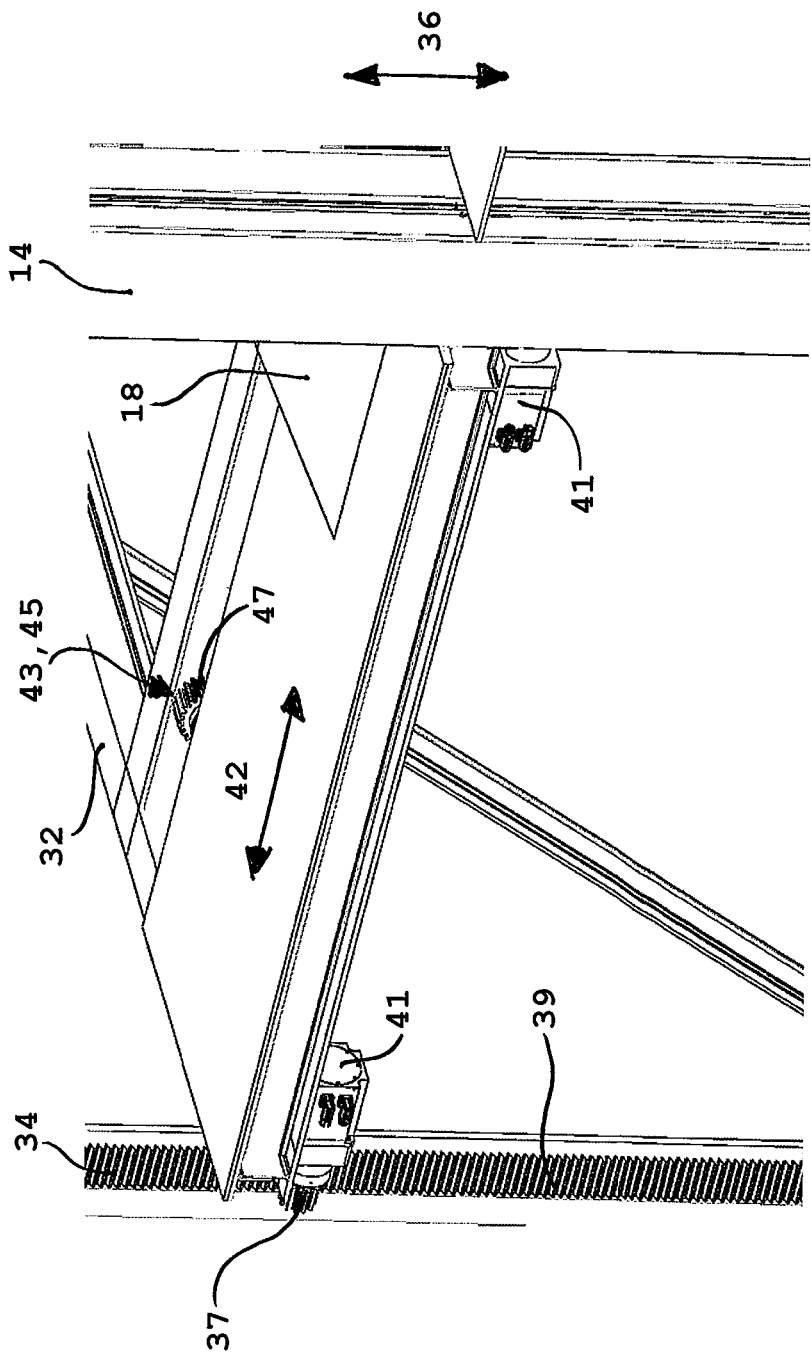
FIG. 4 is an enlarged view of the detail according to FIG. 3.

For it to be possible to change the height of the storage spaces 16, the storage device 10 comprises a storage base vertical drive 33 in the form of a rack-and-pinion drive 35 for each storage base frame 32. A rack-and-pinion drive 35 of this type is shown in FIGS. 3 and 4. The storage base vertical drive 33 is designed such that the storage base frames 32 can be moved vertically separately from one another in the direction of the double-headed arrow 36. For this purpose, the rack-and-pinion drive 35 comprises a pinion 37 (shown in FIGS. 3 and 4) that meshes with a rack 39. Each pinion 37 of this type is driven by an electrical drive as shown in FIGS. 3 and 4, in particular by an electric motor 41. Overall, in each case, at least one electric motor 41 is arranged on a storage base frame 32 together with at least one pinion 37.

Therefore, the height 38 of a storage space 16 can be reduced in order to store a base module in a storage space 16, it for example being possible for the height 38 to be increased to store a motor vehicle in a final assembled state. By being driven by the electric motor 41, the pinion 37 can be rotated such that the storage base frame 32 connected to the electric motor 41 can be moved in the direction of the rack 39 or in the direction of the double-headed arrow 36.

The storage device 10 further comprises a storage base horizontal drive 43 in the form of a rack-and-pinion drive 45 that is designed such that a storage base element 18 can be moved horizontally, I.e. In the direction of the double-headed arrow 42, into a storage space 16 or onto a storage base frame 32 by the lifting device 24 or the lifting platform 28. A rack-and-pinion drive 45 of this type is shown in FIGS. 3 and 4.

For this purpose, racks (not shown in the drawings) arranged in parallel with the direction indicated by the double-headed arrow 42 are arranged on the storage base elements 18. Furthermore, pinions 47 that mesh with the racks are arranged on the storage base frames 32 and the lifting platform 28, which pinions can be rotated by an electrical drive, in particular by an electric motor (not shown in the drawings), such that the storage base elements 18 can be moved into a storage space 16 on a storage base frame 32 in the direction of the double-headed arrow 42 by the lifting device 24 or the lifting platform 28.

On the base element 12 on the underside 44 facing away from the support structure 14, the storage device 10 comprises a movement device 49 that comprises a total of six swivel drives 46 that can be actuated and/or swiveled independently of one another, such that the storage device 10 can be moved omnidirectionally by means of the swivel drives 46.

Furthermore, the storage device 10 is designed to be incorporated into a material flow system (not shown in the drawings) and for this purpose comprises a device for location determination and position detection, and devices for data transfer comprising a master controller of a material flow system.

Figure 2:
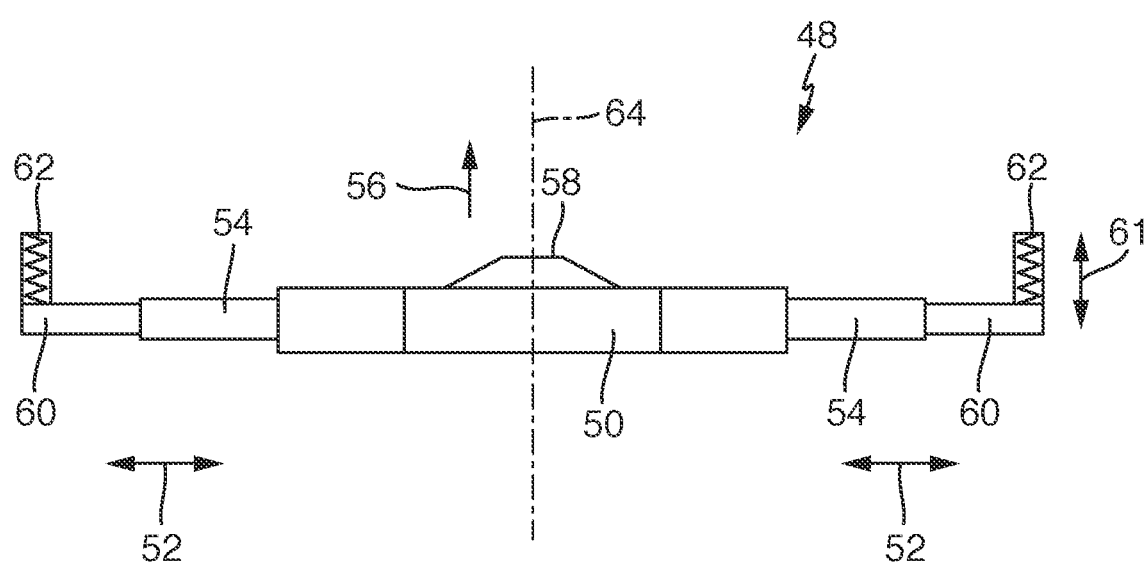
FIG. 2 shows a loading device of a storage device according to the invention.

For loading, the storage device 10 comprises a loading device 48, shown schematically in FIG. 2. The loading device 48 is designed for arrangement on a storage base element 18 and can be fastened to a storage base element 18. It is conceivable here for the loading device 48 to be able to be screwed to a storage base element 18.

The loading device 48 comprises a main body 50 and telescopic arms 54 that can be telescopically extended out of the main body 50 in the direction of the double-headed arrows 52. The telescopic arms 54 can be moved in the longitudinal direction of the main body 50 by means of a linear drive.

The loading device 48 comprises a support ridge 58 that is arranged orthogonally to a longitudinal extension of the main body 50 and can be extended orthogonally to the longitudinal extension of the main body 50 in the direction of the arrow 56. The ridge 58 can also be moved linearly in the longitudinal direction of the main body 50. Furthermore, the loading device 48 comprises support pegs 62 that can be extended orthogonally to the longitudinal extension of the main body 50, i.e. in the direction of the arrow 61, at the free ends 60 of the telescopic arms 54.

The loading device 48 can also be connected to a storage base element 18 for conjoint rotation such that it is possible for the loading device 48 to rotate about a rotational axis 64.

The self-driving storage device 10 according to the invention functions as follows:

If a body component or a motor vehicle in a final or partially assembled state arranged on a driverless transport vehicle (DTV) is moved towards the storage device 10, the body component or the motor vehicle in a final or partially assembled state can be stored in the storage device 10 by means of the loading device 48 in a loading position of the lifting device 24, i.e. when the lifting platform 28 is moved downwards towards the base element 12.

For this purpose, the support ridge 58 can be brought into contact with a support point on the body component or motor vehicle in a final or partially assembled state provided for this purpose, it then being possible to retract the support pegs of the driverless transport vehicle (DTV) and to extend the support pegs 62 of the loading device 48. This therefore allows transfer from the driverless transport vehicle (DTV) to the loading device 48 of the storage device 10, such that it is possible to load the storage device 10 without additional cranes or the like.

A body component or a motor vehicle in a final or partially assembled state that is arranged on a loading device 48, which in turn is arranged on a storage base element 18, can then be moved vertically into a storage position by means of the lifting device 24 and can be shifted or moved horizontally into a storage space 16 on a storage base frame 32 by means of the storage base horizontal drive 43.

Owing to the movement device 45 and the swivel drives 46, the self-driving storage device 10 can be integrated into a material flow system (not shown) which comprises a driverless transport vehicle (DTV) for transporting body components of motor vehicles, in particular base modules of motor vehicles, or motor vehicles in a final or partially assembled state.

The invention claimed is:

1. A storage device for storing and/or transporting body components of motor vehicles, base modules of motor vehicles, or motor vehicles in a final or partially assembled state, the storage device comprising:
   a base element and a support structure which is arranged on the base element, is designed to receive the body components or the motor vehicles in a final or partially assembled state, and has a plurality of storage spaces with movable storage base elements, wherein
   the storage device has a movement device which is arranged on the base element and is designed such that the storage device can be moved omnidirectionally in a self-driving manner, in a floor-bound manner,
   the support structure comprises a lifting tower comprising a lifting device for vertically moving the storage base elements and two storage towers arranged on either side of the lifting tower, the storage towers comprising the storage spaces,
   at least one storage base frame is provided per storage tower,
   the support structure comprises vertical guide rails for guiding the storage base frame,
   at least one storage base vertical drive is provided and is designed such that the at least one storage base frame is vertically movable in the storage tower, the storage base vertical drive is a rack-and-pinion drive,
a storage base horizontal drive is provided and is designed such that a storage base element can be moved horizontally into a storage space by the lifting device,
the storage base horizontal drive is a rack-and-pinion drive,
the lifting device comprises a lifting platform and is designed such that the lifting platform can be moved vertically between a loading position and at least one storage position,
the lifting device comprises a cable drive or chain drive,
the lifting tower comprises guide rails for guiding the lifting platform,
the movement device is designed to be incorporated into a material flow system, and
the movement device comprises at least three swivel drives.

2. The storage device according to claim 1, wherein the swivel drives can be actuated and/or swiveled independently of one another.

3. The storage device according to claim 2, wherein
the storage device comprises at least one loading device designed to be arranged on a storage base element.

4. The storage device according to claim 3, wherein the loading device comprises a main body and telescopic arms that can be telescopically extended out of the main body.

5. The storage device according to claim 4, wherein the loading device comprises a support ridge that is arranged in the center of the main body orthogonally to a longitudinal extension of the main body and can be extended orthogonally to the longitudinal extension, and
the loading device comprises support pegs that can be extended orthogonally to the longitudinal extension of the main body at the free ends of the telescopic arms.

6. A material flow system comprising at least one driverless transport vehicle (DTV) for transporting body components of motor vehicles, base modules of motor vehicles, or motor vehicles in a final or partially assembled state, and a storage device according to claim 5.

7. A storage device for storing and/or transporting body components of motor vehicles, base modules of motor vehicles, or motor vehicles in a final or partially assembled state, the storage device comprising
a base element and a support structure which is arranged on the base element, is designed to receive the body components or the motor vehicles in a final or partially assembled state, and has a plurality of storage spaces with movable storage base elements, wherein
the storage device has a movement device which is arranged on the base element and is designed such that the storage device can be moved omnidirectionally in a self-driving manner, in a floor-bound manner
the support structure comprises a lifting tower comprising a lifting device for vertically moving the storage base elements and two storage towers arranged on either side of the lifting tower, the storage towers comprising the storage spaces,
at least one storage base frame is provided per storage tower,
the support structure comprises vertical guide rails for guiding the storage base frame,
at least one storage base vertical drive is provided and is desisted such that the at least one storage base frame is vertically movable in the storage tower,
the storage base vertical drive is a rack-and-pinion drive,
a storage base horizontal drive is provided and is designed such that a storage base element can be moved horizontally into a storage space by the lifting device,
the storage base, horizontal drive is a rack-and-pinion drive,
the lifting device comprises a lifting platform and is designed such that the lifting platform can be moved vertically between a loading position and at least one storage position,
the lifting device comprises a cable drive or chain drive,
the lifting tower comprises guide rails for guiding the lifting platform,
the movement device is designed to be incorporated into a material flow system, and
the movement device comprises at least six swivel drives.

8. A self-driving storage device for storing and/or for transporting in particular body components of motor vehicles, in particular base modules of motor vehicles, or finally-assembled or partially-assembled motor vehicles, having a base element and a support structure which is arranged on the base element, and is designed to receive the body components or the finally-assembled or partially-assembled motor vehicles and has a plurality of storage spaces having movable storage base elements, the self-driving storage device comprising:
a movement device which is arranged at the base element and is designed such that the storage device can be moved omnidirectionally in a self-driving manner, in particular in a floor-bound manner, wherein
the storage base elements are displaceable,
the support structure comprises a lifting tower having a lifting device for vertically moving the storage base elements and two storage towers which are arranged on respective opposite sides of the lifting tower,
the storage lowers having the storage spaces and at least one storage base frame being provided per storage tower,
the support structure has vertical guide rails for guiding the storage base frame,
at least one storage base vertical drive being provided, which is designed such that the at least one storage base frame in the storage tower is vertically movable and a storage base horizontal drive is provided, which is designed such that a storage base element is horizontally movable to a storage space by means the lifting device,
the storage base vertical drive is a rack-and-pinion drive,
the storage base horizontal drive is a rack-and-pinion drive,
the lifting device comprises a lifting platform and is designed such that the lifting platform is vertically movable between a loading position and at least one storage position,
the lifting device has a cable drive or chain drive,
the lifting tower has guide rails for guiding the lifting platform,
the movement device is designed to be incorporated into a material flow system, and
the movement device has at least three swivel drives.

9. The self-driving storage device according to claim 8, wherein
the swivel drives are actuated and/or swiveled independently of one another.

10. The self-driving storage device according to claim 9, wherein
the self-driving storage device has at least one loading device which is designed to be arranged on a storage base element.

11. The self-driving storage device according to claim 10, wherein
the loading device has a main body and telescopic arms which are telescopically extended out of the main part.

12. The self-driving storage device according to claim 11, wherein
the loading device has a support ridge which is arranged orthogonally to a longitudinal extension of the main body in a main body center and is in particular extendable orthogonally to the longitudinal extension, and in that the loading device has, at the free ends of the telescopic arms, support pegs which are extendable orthogonally to the longitudinal extension of the main part.

13. A self-driving storage device for storing and/or for transporting in particular body components of motor vehicles, in particular base modules of motor vehicles, or finally-assembled or partially-assembled motor vehicles, having a base element and a support structure which is arranged on the base element, and is designed to receive the body components or the finally-assembled or partially-assembled motor vehicles and has a plurality of storage spaces having movable storage base elements, the self-driving storage device comprising:
a movement device which is arranged at the base element and is designed such that the storage device can be moved omnidirectionally in a self-driving manner, in particular in a floor-bound manner, wherein
the storage base elements are displaceable,
the support structure comprises a lifting tower having a lifting device for vertically moving the storage base elements and two storage towers which are arranged on respective opposite sides of the lifting tower,
the storage lowers having the storage spaces and at least one storage base frame being provided per storage tower,
the support structure has vertical guide rails for guiding the storage base frame,
at least one storage base vertical drive being provided, which is designed such that the at least one storage base frame in the storage tower is vertically movable and a storage base horizontal drive is provided, which is designed such that a storage base element is horizontally movable to a storage space by means the lifting device,
the storage base vertical drive is a rack-and-pinion drive,
the storage base horizontal drive is a rack-and-pinion drive,
the lifting device comprises a lifting platform and is designed such that the lifting platform is vertically movable between a loading position and at least one storage position,
the lifting device has a cable drive or chain drive,
the lifting tower has guide rails for guiding the lifting platform,
the movement device is designed to be incorporated into a material flow system, and
the movement device has at least six swivel drives.

* * * * *